United States Patent [19]

Fujio

[11] Patent Number: 4,813,646
[45] Date of Patent: Mar. 21, 1989

[54] DISPOSABLE PLASTIC CONTAINER FOR ICES

[75] Inventor: Jiro Fujio, Toyonaka, Japan

[73] Assignee: San-Ei Chemical Industries, Ltd., Osaka, Japan

[21] Appl. No.: 162,759

[22] Filed: Mar. 1, 1988

[30] Foreign Application Priority Data

Mar. 6, 1987 [JP] Japan .............................. 62-33396[U]

[51] Int. Cl.⁴ .............................................. A41G 1/02
[52] U.S. Cl. ........................................ 249/55; 249/61; 249/127; 249/130; 249/132; 426/115; 426/122; 426/414; 426/515
[58] Field of Search .................... 249/55, 61, 110, 119, 249/127, 130, 132, 134; 426/115, 119, 122, 393, 413, 414, 515

[56] References Cited

U.S. PATENT DOCUMENTS

| | | | |
|---|---|---|---|
| 2,791,324 | 5/1957 | Knoop et al. | 426/122 X |
| 3,162,539 | 12/1964 | Repko | 426/122 X |
| 3,983,994 | 10/1976 | Wyslotsky | 426/115 X |
| 4,223,043 | 9/1980 | Johnson | 426/122 |
| 4,455,320 | 6/1984 | Syrmis | 249/55 X |
| 4,587,810 | 5/1986 | Fletcher | 249/130 X |

*Primary Examiner*—Charles Hart
*Attorney, Agent, or Firm*—Bryan, Cave, McPheeters & McRoberts

[57] ABSTRACT

A disposable plastic container for ices comprising a pair of substantially equally shaped films of a thermoplastic synthetic resin laid one upon the other and welded or adhered to each other. They are joined only partly to define therebetween a liquid inlet which is closed after a liquid for forming ices has been introduced therethrough, and a plurality of compartments each capable of holding the liquid therein and allowing it to be frozen at a low temperature. The films define a joined edge portion surrounding all of the compartments and provided with a plurality of notches which enable the films to be torn across the compartments, so that the frozen products which have been formed in the compartments can be removed therefrom.

13 Claims, 9 Drawing Sheets

DISPOSABLE PLASTIC CONTAINER FOR ICES

FIELD OF THE INVENTION

This invention relates to a disposable plastic container for ices, and more particularly to a disposable plastic container having a plurality of compartments which can hold a liquid, such as fruit juice, a mix containing fruit juice, or water, and can freeze it to form a plurality of ices when left at a low temperature.

RELATED ART STATEMENT

There is known a disposable container for ices comprising a pair of substantially equally shaped films of a thermoplastic synthetic resin laid one upon the other and fused, or joined adhesively, to each other partly so that they may define therebetween a liquid inlet which is closed after a liquid for forming ices has been introduced therethrough, and a plurality of compartments each holding the liquid therein and allowing it to be frozen at a low temperature.

This container facilitates the freezing of the liquid at a low temperature. It is, however, not easy to remove the frozen products from the container. The container is required to withstand the load imposed thereon by the liquid when it is introduced, during its storage and when it is frozen, and also the specific shape which it forms when frozen. Therefore, it is constructed so strongly as not to be easily broken. If it can be torn easily to permit easy removal of the frozen products, it cannot withstand the load or expansion of the liquid during its introduction or storage, or the expansion which it undergoes when it is frozen, but is broken to allow the liquid to leak out before it is completely frozen.

SUMMARY OF THE INVENTION

According to this invention, there is provided a disposable plastic container for ices comprising a pair of substantially equally shaped films of a thermoplastic synthetic resin laid one upon the other and welded or adhered, to each other partly so that they may define therebetween a liquid inlet which is closed after a liquid for forming ices has been introduced therethrough, and a plurality of compartments each holding the liquid therein and allowing it to be frozen at a low temperature, the two films having a joined edge portion provided with a plurality of notches which enable the films to be torn across the compartments to thereby allow for the removal from the compartments of the frozen products which have been formed therein.

The notches made in the edge portion of the container as defined by the films laid one upon the other make it easy to tear the container open and take the frozen products out of the compartments, while the container itself is so strong that it is not easily broken at any time from the injection of the liquid to its freezing. The container can be thrown away when the frozen products have been taken out.

The notches are so directed as to enable the container to be torn across the compartments. Each of the notches is preferably directed substantially toward the center of the corresponding compartments.

Each notch is a linear cut, or preferably a triangular cut having pointed bottom of each notch and the nearest edge of the corresponding compartment (i.e. the width along which the edge portion of the container must be torn) is preferably from 3 to 15 mm, and more preferably from 5 to 12 mm, though it depends on the material of the films and the degree to which they are sealed by heat. If it is smaller than 3 mm, there is some likelihood that the container may be broken when the liquid is injected, during its storage, or when it is frozen. If it is larger than 15 mm, it makes it difficult to tear the container open. The edge portion of the container containers. The edge portion of the container along which the films are welded or adhered, to each other has a width of at least 7 to 25 mm, and preferably from 10 to 20 mm. Each boundary area where the films are also welded or adhered to divide two adjoining compartments from each other has a width of 3 to 10 mm, and preferably from 4 to 7 mm.

The notches are preferably provided for all of the compartments located along the edge portion of the container, though its may also be possible to provide them for only a part (e.g. two or there) of the compartments.

The film which can be used for the purpose of this invention is a soft sheet of a thermoplastic synthetic resin. A polyethylene resin film is, among others preferred.

The disposable plastic container of this invention makes it possible to produce ices, including simple ice, at home or on a commercial basis by causing to be frozen a liquid such as fruit juice , a mix containing fruit juice (a mixture of fruits juice with milk, sugar, water, etc.), or water. The compartments are so sized that the ice which has been produced in each compartment can be eaten at a mouthful. It is a disposable plastic container which facilitates the production of ices in a domestic refrigerator, or the like.

DESCRIPTION OF THE PREFERRED EMBODIMENTS

Referring first to FIGS. 1 to 4, a disposable plastic container 1 for ices comprises a pair of generally rectangular polyethylene resin films 2 and 3 laid one upon the other. They are welded partly as shown by oblique lines in FIG. 2 to define therebetween a plurality of substantially square compartments 4, 5, 6, . . . each capable of holding a liquid, and a liquid inlet 10 through which the liquid can be introduced into the compartments 7, 8, 9, . . . at the front end of the container, and which is closed or pinched after the liquid has been introduced. Passageways 11, 12, . . . are provided for connecting two adjoining compartments 7 and 4, 8 and 5, . . . to enable the passage of the liquid from the first row of compartments 7, 8, 9, ... to the remaining rows of compartments 4, 5, 6, ....

Figure 1:
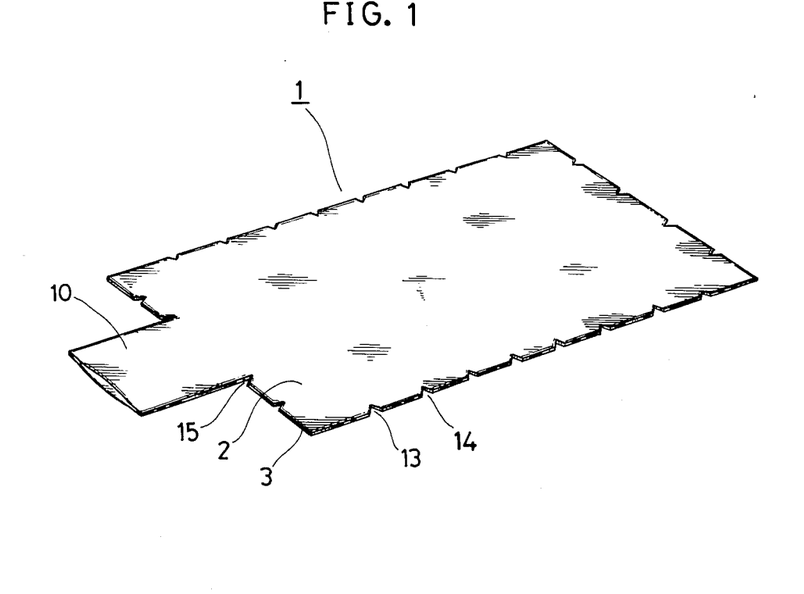
FIG. 1 is a perspective view of a disposable plastic container for ices embodying this invention.
Figure 2:
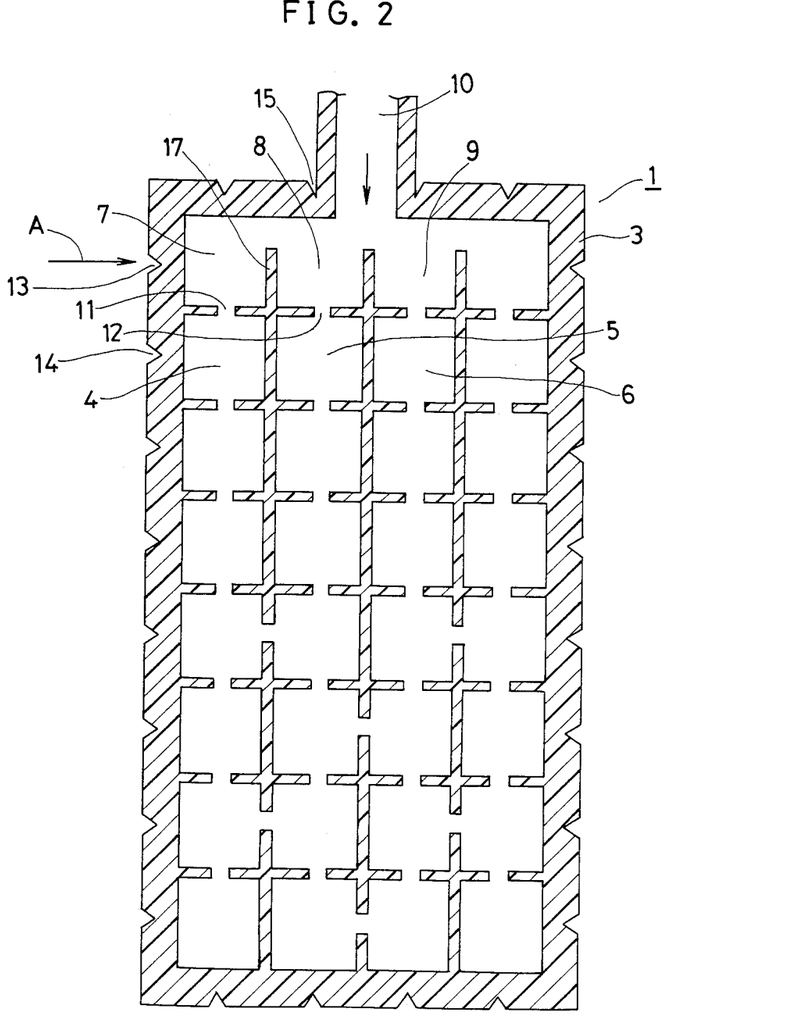
FIG. 2 is a view showing how the two films forming the container are welded.

A plurality of notches 13, 14, 15, ... are provided in the edge portion of the films 2 and 3 joined together. Each notch is a triangular cut having a pointed bottom. The notches are directed substantially toward the centers of the corresponding compartments 7, 4, 8, ..., respectively.

Figure 3:
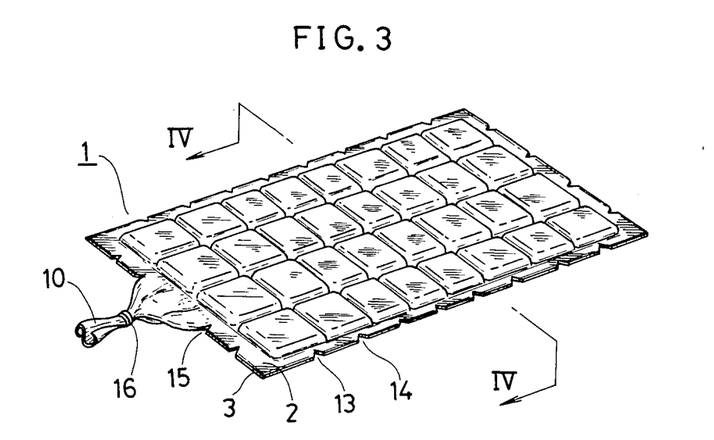
FIG. 3 is a perspective view of the container having a liquid inlet pinched after a liquid for forming ices has been injected therethrough.
Figure 4:
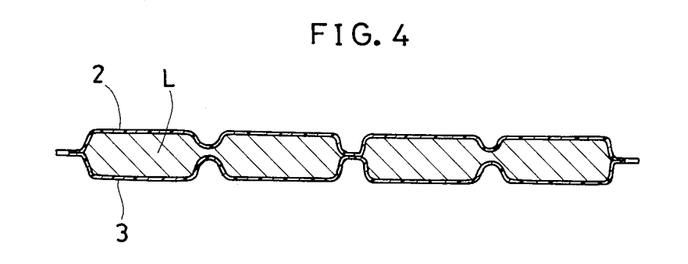
FIG. 4 is a sectional view taken along the line IV—IV of FIG. 3.

When the disposable container 1 as hereinabove described is used, a liquid L is introduced through the liquid inlet 10 into the compartments 7, 8, ... at the front end until it passes through the passageways 11, 12, ... and fills all of the compartments 4, 5, .... Then, the inlet 10 is closed by pinching with a small rubber band 16, as shown in FIG. 3.

The container 1 is, then, placed in a refrigerator not shown so that the liquid L may be frozen at a low temperature (e.g. $-15°$ C.). Then, the container 1 is taken out of the refrigerator and its edge portion, the films 2 and 3 defining the compartment 7, a partition 17 between the compartments 7 and 8, the films defining the compartment 8, ... are torn at the notch 13 and one after another in the direction of an arrow A, so that the frozen product of the liquid L may be removed from each compartment.

The notch 13 having a triangular shape makes easily visible the point at which the tearing of the container is started. As its pointed bottom and therefore the arrow A are directed substantially toward the center of the compartment 7, it is easy to tear the compartment 7 open to take out the frozen product.

The notches 14, 13, 15, ... are provided for all of the compartments 4, 7, 8, ... located along the edge portion of the container 1, so that it may be easy to take out the frozen products from all the compartments of the container.

Figure 5:
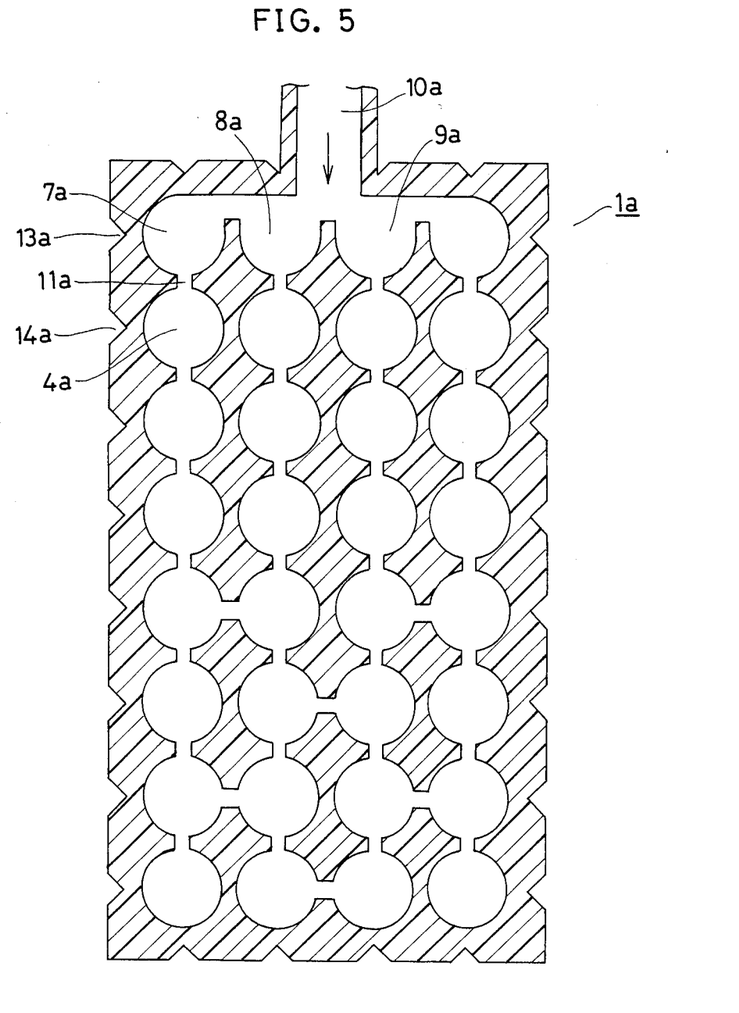
FIGS. 5 and 6 are each a view similar to FIG. 2, but showing another embodiment of this invention.
Figure 6:
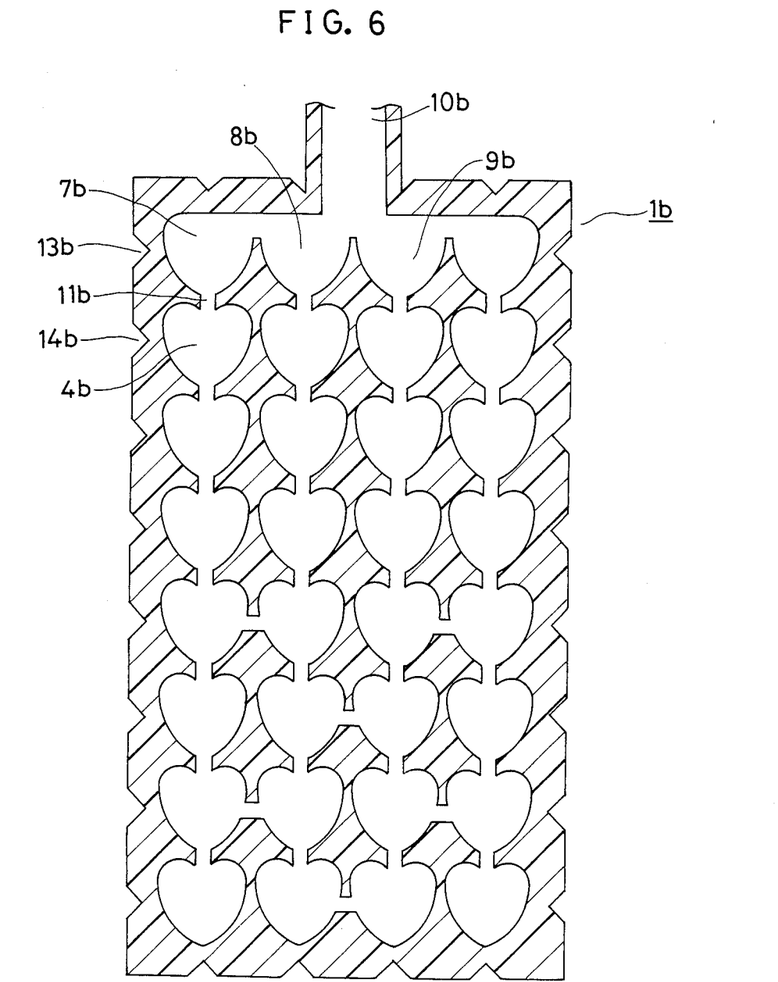
Figure 7:
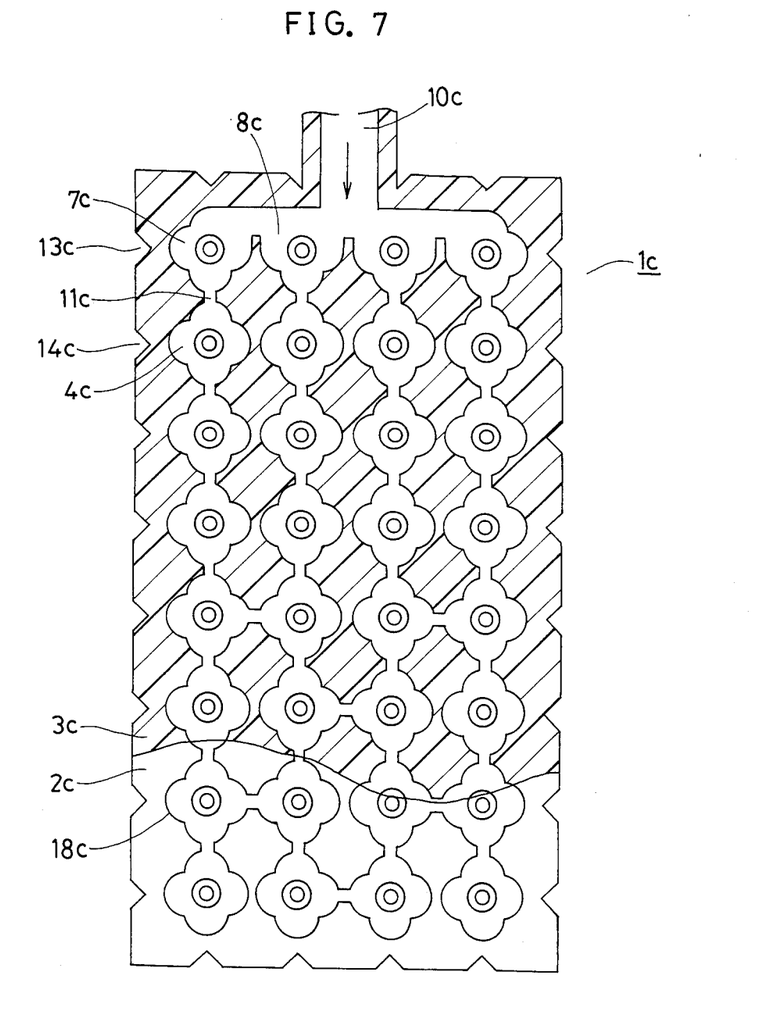
FIGS. 7 to 10 are each a view similar to FIG. 2, but showing, partly in top plan, how the two films forming the container according to still another embodiment of this invention are sealed by heat.
Figure 8:
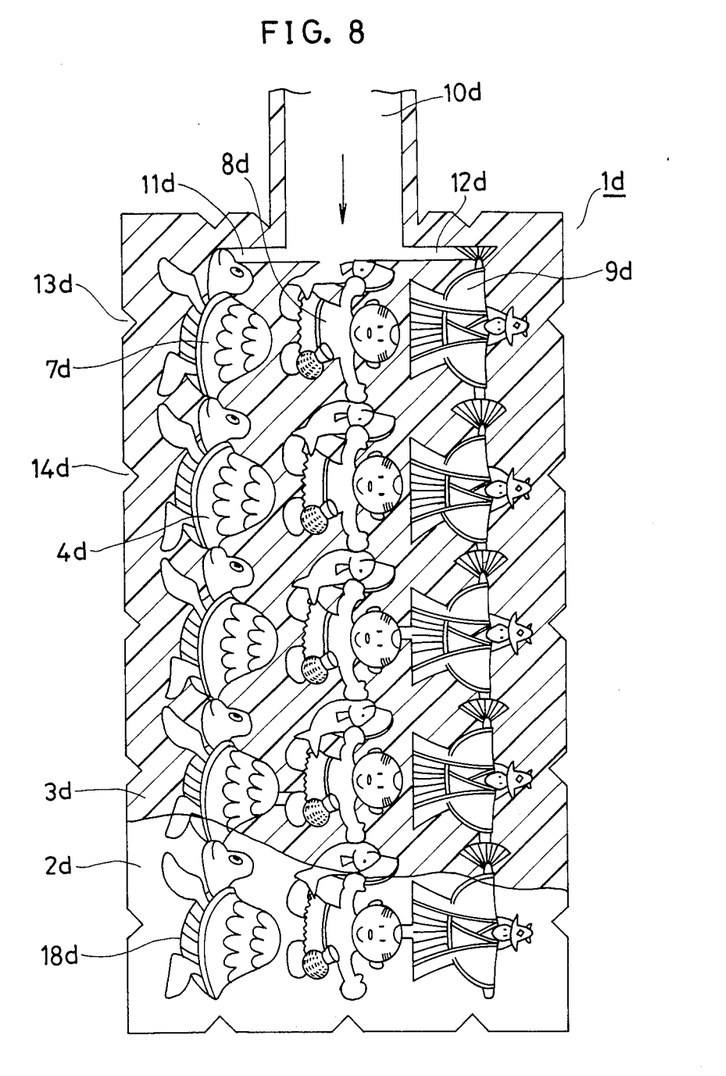
Figure 9:
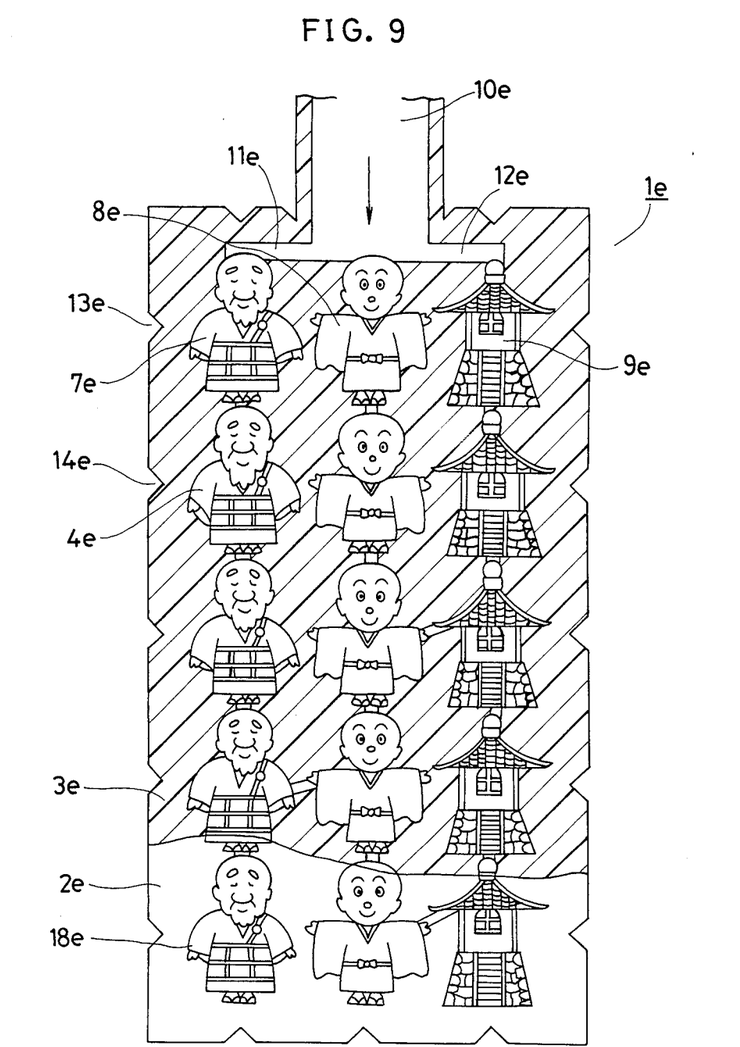
Figure 10:
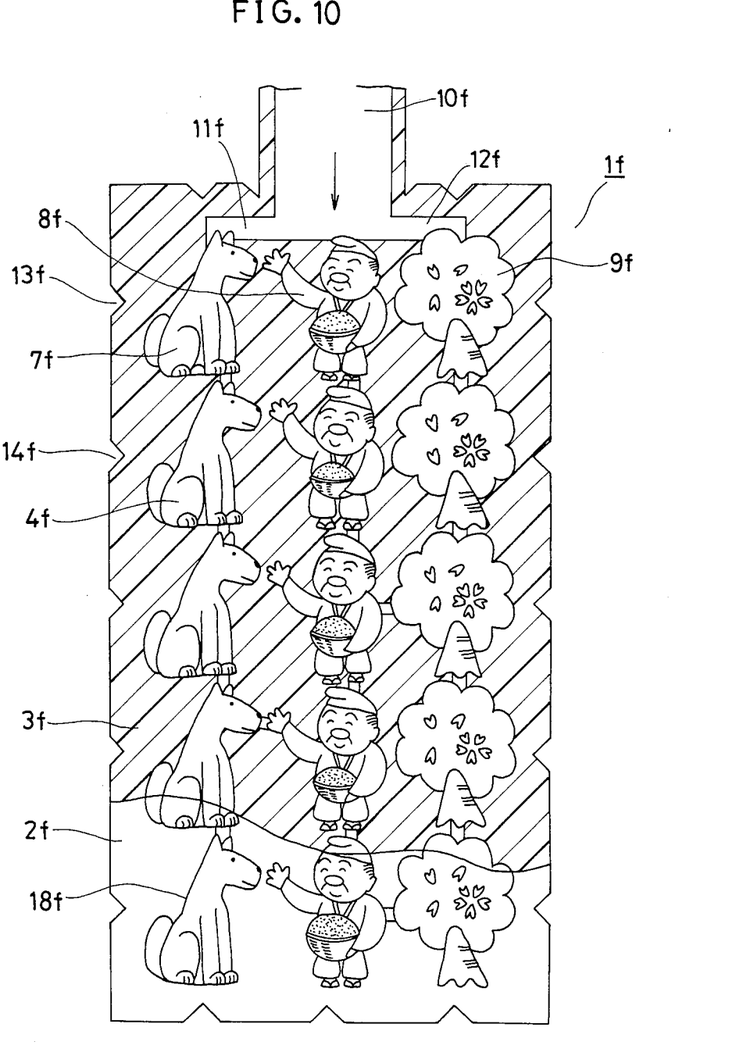

Although the compartments have been described as having a square shape, they may also have a different shape, e.g. may be substantially circular or heart-shaped as shown in FIGS. 5 and 6, or oval or diamond-shaped. Moreover, FIG. 7 shows compartments each having a shape which is substantially equal to that of a flower. A design representing the outline and center of the flower can be printed on one side of the container efined by two films 2c and 3c, as shown at 18c. FIGS. 8 to 10 show compartments each having a shape which represents a character, animal, building, plant, etc. appearing in an old tale. Its design is printed on both sides of the container defined by two films 2d and 3d, ..., as shown at 18d.

Although the containers have been described or shown as having a rectangular shape, they may also be differently shaped, e.g square, circular, oval or triangular, if they are easy to handle and are so sized that they can easily be placed in a refrigerator. The following is a list showing merely by way of example the dimensions with which the container 1 as hereinabove described with reference to FIGS. 1 to 4 can be manufactured:

Large rectangular portion defining the compartments, passageways etc.: 190 mm×350 mm
Small rectangular portion defining the liquid inlet: 40 mm×100 mm
Compartment: About 34 mm×36 mm
Width of the edge portion between the outermost edge of the container and the outermost edges of the compartments: At least about 16 mm
Width of each partition between two adjoining compartments: About 5 mm
Depth of each notch: About 6 mm
Angle of the pointed bottom of each notch: About 60°

What is claimed is:

1. A disposable plastic container for formation of frozen products comprising a pair of substantially equally shaped films of a thermoplastic synthetic resin laid one upon the other and welded or adhered to each other to define therebetween a liquid inlet which may be closed after a liquid for forming a frozen product has been introduced therethrough, and a plurality of compartments, each compartment capable of holding the liquid therein and allowing it to be frozen at a low temperature, said two films having a joined edge portion along their respective peripheries provided with a plurality of notches, each compartment along the joined edge portion of said films having a notch adjacent thereto, said notches allowing said films to be torn across said compartments to thereby allow for the removal from said compartments of the frozen products which have been formed therein.

2. A container as sent forth in claim 1, wherein said notches are each directed substantially toward the centers of the corresponding compartments.

3. A container as set forth in claim 1, wherein each of said notches is a triangular cut having a pointed bottom.

4. A container as set forth in claim 1, wherein each of said notches has a distance of 5 mm to 12 mm from one of said compartments which is closer to said each notch than any other compartment is.

5. A container as set forth in claim 1, wherein said edge portion has a width of 10 mm to 20 mm.

6. A container as set forth in claim 1, wherein said films define a plurality of partitions each dividing the adjoining two of said compartments, the majority of said partitions being each provided therethrough with a passageway connecting two adjoining compartments.

7. A container as set forth in claim 6, wherein each of said passageways is substantially accurately aligned with at least one of said notches.

8. A container as set forth in claim 1, wherein each of said compartments has a substantially square, circular, or heart shape.

9. A container as set forth in claim 1, wherein each of said compartments has a shape which represents a person, animal, building, or plant.

10. A container as set forth in claim 9, wherein a design showing said shape is printed on the surface of at least one of said films.

11. A container as set forth in claim 1, wherein said films form a main rectangular portion defining said compartments, and an auxiliary rectangular portion projecting from one of the short sides of said main portion and defining said liquid inlet, said auxiliary portion being smaller than said main portion.

12. A container as set forth in claim 1, wherein said films are of a polyethylene resin.

13. A container as set forth in claim 1, wherein said liquid is fruit juice, a mix containing fruit juice, or water.

* * * * *